United States Patent [19]
Toedter

[11] Patent Number: 5,581,440
[45] Date of Patent: Dec. 3, 1996

[54] ROTATABLE BUSHING FOR REDUCING BENDING STRESS IN ELECTRICAL CABLE

[75] Inventor: Peter K. Toedter, Trabuco Canyon, Calif.

[73] Assignee: AST Research, Inc., Irvine, Calif.

[21] Appl. No.: 947,279

[22] Filed: Sep. 18, 1992

[51] Int. Cl.$^6$ ............................ G06F 1/16; H05K 7/02; E05D 5/14; H01R 3/00
[52] U.S. Cl. .................... 361/683; 361/679; 16/386; 439/165; 174/136
[58] Field of Search ...................... 174/135, 136, 174/65 R, 151, 1, 81, 86; 16/223, 386, 374, 377; 439/165, 31, 164; 361/390–395, 398, 399, 413, 415, 679–686, 724–727, 749–751, 789, 796, 803; 364/708, 708.1; 248/917–923; 340/700, 711; 341/22

[56] References Cited

U.S. PATENT DOCUMENTS

| | | | |
|---|---|---|---|
| 3,042,471 | 7/1962 | Haslup | 312/329 |
| 4,571,456 | 2/1986 | Paulsen et al. | 379/96 |
| 4,625,259 | 11/1986 | Krechmer et al. | 361/395 X |
| 4,756,940 | 7/1988 | Payne et al. | 361/398 X |
| 4,825,395 | 4/1989 | Kinser, Jr. et al. | 364/708 |
| 4,842,531 | 6/1989 | Takemura | 439/165 |
| 4,852,033 | 7/1989 | Saitou | 364/708 |
| 4,864,523 | 9/1989 | Sasaki | 364/708 |
| 4,959,887 | 10/1990 | Gruenberg et al. | 364/708 X |
| 4,986,507 | 1/1991 | Chiang | 248/923 X |
| 4,986,763 | 1/1991 | Boyle | 439/165 |
| 5,001,659 | 3/1991 | Watabe | 364/708 |
| 5,007,849 | 4/1991 | Shinoda | 439/165 |
| 5,253,142 | 10/1993 | Weng | 361/680 |

FOREIGN PATENT DOCUMENTS

| | | | |
|---|---|---|---|
| 2742900 | 7/1978 | Germany | 174/135 |
| 59-135959 | 8/1984 | Japan . | |
| 3-72695 | 6/1991 | Japan . | |

OTHER PUBLICATIONS

"Improving Reliability of Flat Cable Assemblies", George Hansell and Herb Van Deusen, pp. 142–146. Paper presented at: Twelfth Annual Connector Symposium Proceedings, Cherry Hill, N.J. (17–18 Oct., 1979).

Primary Examiner—Michael W. Phillips
Attorney, Agent, or Firm—Knobbe, Martens, Olson & Bear

[57] ABSTRACT

A rotatable bushing for reducing bending fatigue on a flat cable between a display screen cover and a base of a portable computer comprises an elongate cylindrical body having a diametric slot therethrough. The bushing is positioned along the hinge axis between the cover and the base of the portable computer. The cable extends from the cover display screen, through the slot, and to circuitry within the base of the computer. MYLAR Plastic shields also extend through the slot on either side of the cable. When the cover is closed and opened over 180°, the cable applies force to the bushing, which is free to rotate as dictated by the force applied by the cable. The rotation of the bushing effectively provides two bending regions on the top and bottom of the bushing slot so that the cable does not bend through the entire range of motion of the cover at a single point. Since the bending of the cable is distributed, fatigue due to bending stress is significantly decreased. The mylar shields and the cable are fixed to the cover, close to the hinge, so there is very little sliding friction between the shields and the cable, and the shields engage and easily accommodate the limited sliding within the bushing.

16 Claims, 4 Drawing Sheets

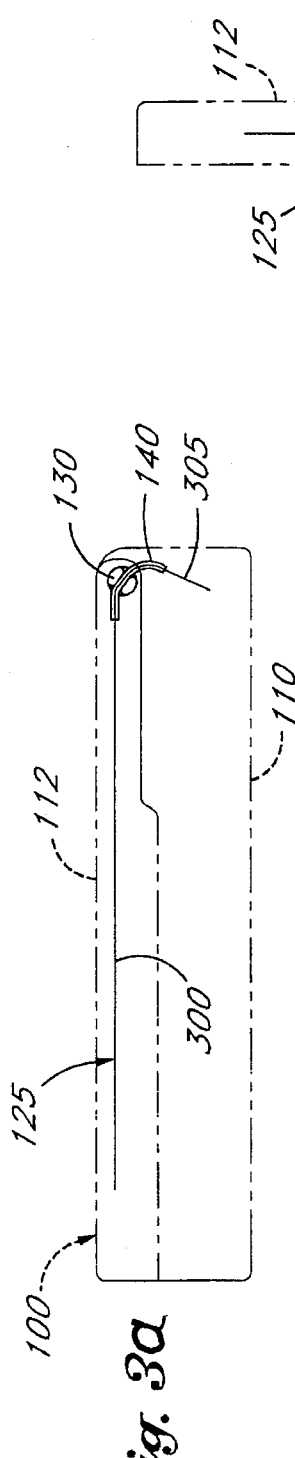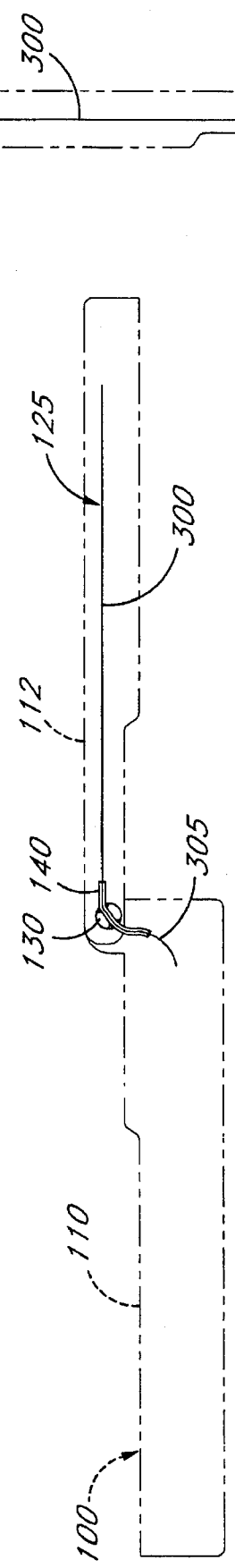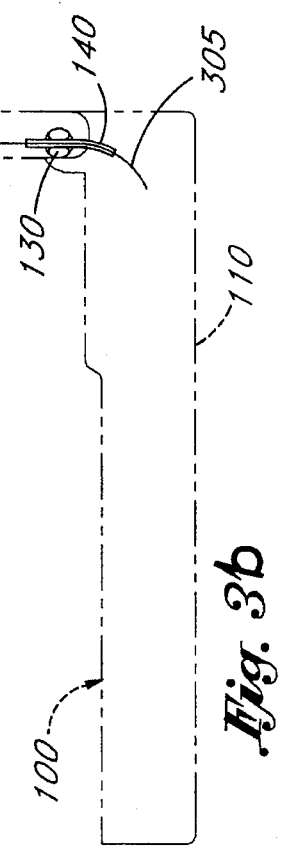

ROTATABLE BUSHING FOR REDUCING BENDING STRESS IN ELECTRICAL CABLE

BACKGROUND OF THE INVENTION

1. Field of the Invention

The present invention relates to a system to reduce bending stress on conductive cables, and more particularly to reduce wear on a flex cable between the base of a laptop computer and a pivotable display screen.

2. Description of the Related Technology

Portable personal computers, such as laptop or notebook computers, have become quite popular in recent years. The increased demand for such computers has been partially due to the compact size of these computers which make them ideal for travel or in applications where work space is limited.

In order to maximize space efficiency and facilitate portability of these laptop and notebook computers, most of these computers have an LCD display screen which pivots or folds down into a closed position over the computer keyboard. Although this is useful in conserving space and protecting both the screen and the keyboard during travel, etc., the pivotable display screen requires certain necessities. In particular, the display screen must be electrically connected to the base of the computer by wires or other suitable connection means. For most of these computers, opening and closing of the display screen requires that the wires bend through a relatively large angle. In some recent applications, this angle may be as large as 180°. Thus, constant opening and closing of the display screen may cause extensive wear on the wires due mostly to bending stress or frictional contact with the hinge between the screen and the base of the computer.

Therefore, a need exists for a suitable system which reduces wear due to bending stress on cables between the display screen and the base of a portable computer.

SUMMARY OF THE INVENTION

Briefly stated, the invention includes an electrical device, such as a laptop or notebook computer, having a suitcase-type construction that includes a base having a keyboard, and a hinged cover including a computer screen. A flexible electrical cable connecting the screen to circuitry in the base extends through a slot in a bushing which is rotatably mounted in the hinge. The bushing is free to rotate with respect to the hinge as urged by the cable during opening and closing movement of the cover. This arrangement effectively causes the cable to bend at two spaced locations rather than one, as would be the case if the bushing were fixed to either the base or the cover. Thus, bending stress on the cable is minimized and its useful life is correspondingly lengthened.

In a preferred form of the invention, a protective sheath also extends through the bushing slot and surrounds the portion of the cable extending through the bushing. Preferably, both the cable and the bushing are affixed to the cover close to the hinge axis. Ends of the sheath extending into the base are free with respect to the cable and the base, and the cable of course has some slack within the base to accommodate limited movement. With this arrangement, any friction introduced by the bushing is felt by the sheath rather than the bushing. Preferably, the sheath is formed by two thin, flexible sheets of opaque, low-friction plastic material.

The method of the invention includes mounting the cable, bushing, and sheath as outlined above.

BRIEF DESCRIPTION OF THE DRAWINGS

FIGS. 3a–3c are schematic views which show the overall orientation of the connecting flex cable and the pivot bushing within the computer when the display screen is closed, opened to a 90° angle, and opened to a 180° angle, respectively.

DETAILED DESCRIPTION OF THE INVENTION

Figure 1:
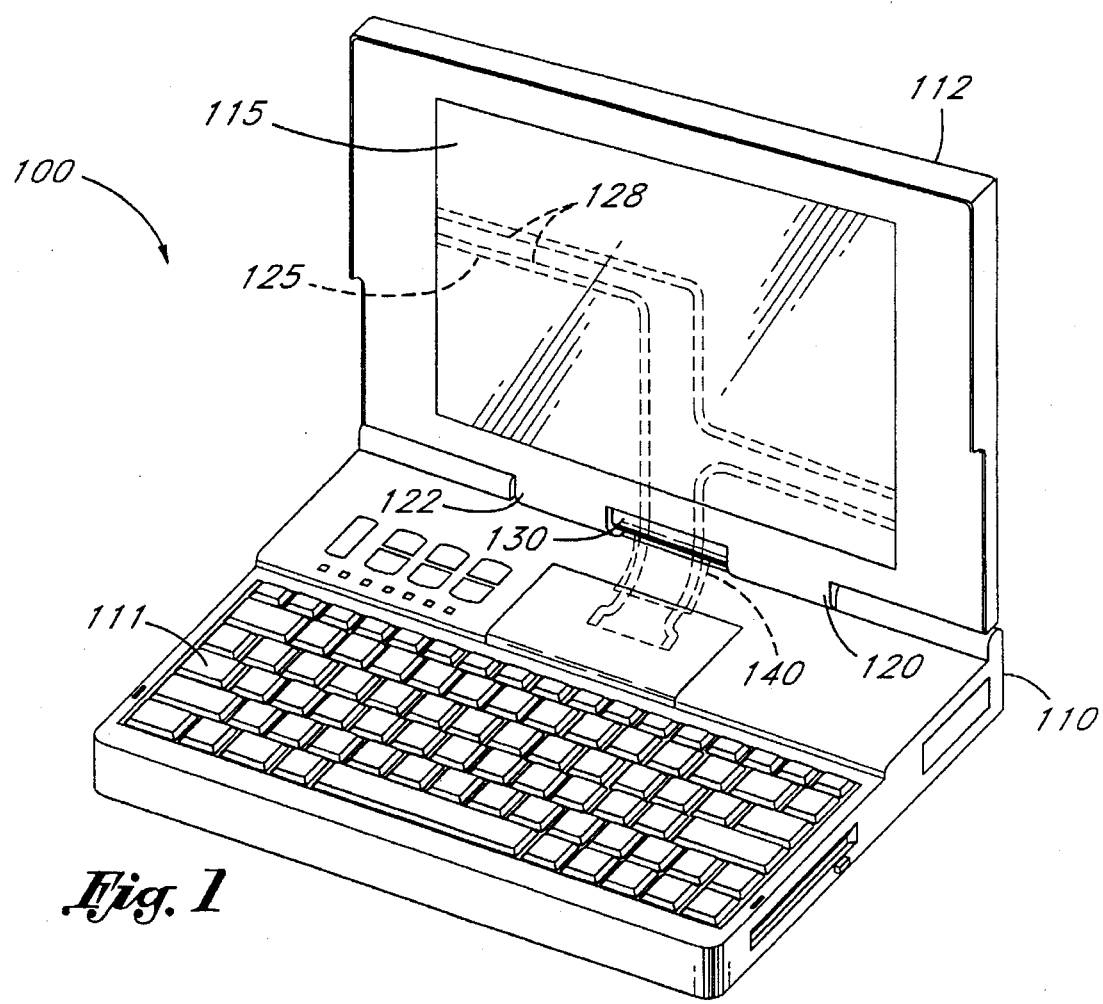
FIG. 1 is a perspective view of a portable computer having a cable protector constructed in accordance with the present invention.
Figure 1A:
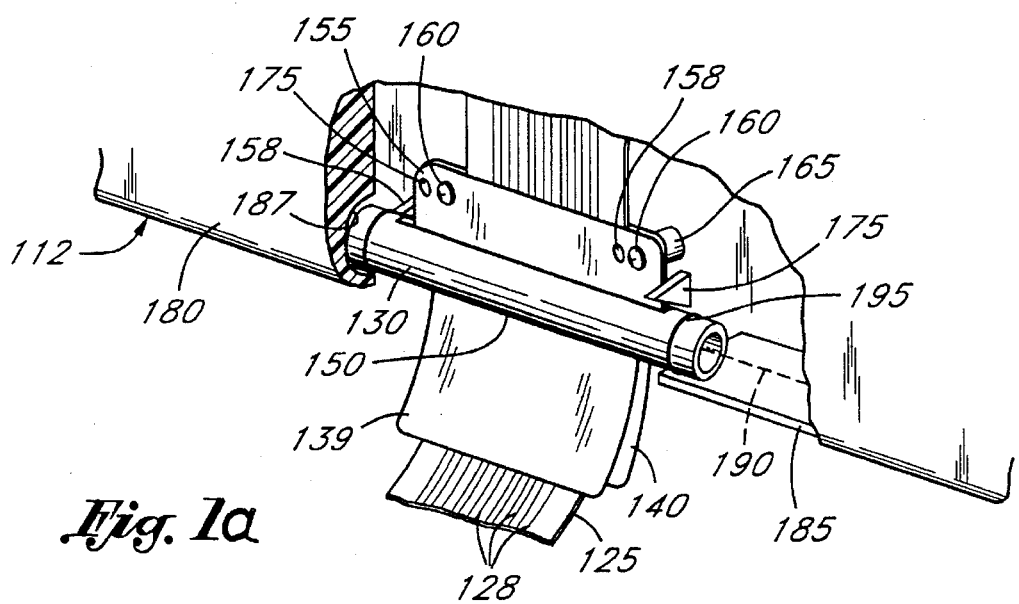
FIG. 1a is an enlarged cutaway view of the region where the cable extends between the display screen and the base of the computer shown in FIG. 1.

Referring to FIGS. 1 and 1a, an electrical product in the form of a computer 100 includes a base 110 with a keyboard 111, and a pivotable cover 112 including an LCD display screen 115. The cover 112 connects to the base 110 by means of suitable support hinges 120 and 122, to form a suitcase like construction. A flexible connection cable 125 (shown in phantom in FIG. 1) extends between the base 110 and the screen 115. The cable 125 is a thin, generally flat, flexible but yet somewhat stiff cable having a plurality of electric conductors 128 running therethrough. The cable 125 connects circuitry (not shown) within the base 110 of the computer 100 to the appropriate driving inputs (also not shown) of the display screen 115.

The cable 125 passes through an elongated, generally cylindrical pivot bushing 130. The longitudinal axis 190 of the pivot bushing 130 is advantageously aligned with the hinge axis which extends through the hinges 120, 122 between the screen 115 and the base 110 of the computer 100.

The cable also passes through a sheath 139 formed by a pair of shields 140, which are flat, thin sheets of preferably opaque plastic, such as Mylar® Plastic Sheets. The sheath protects the cable 125 and prevents the cable from being exposed to view when the cover 112 is in the open position. The pivot bushing 130 reduces wear on the flex cable 125 due to bending stress, and the sheath 140 prevents wear due to frictional contact.

Figure 2:
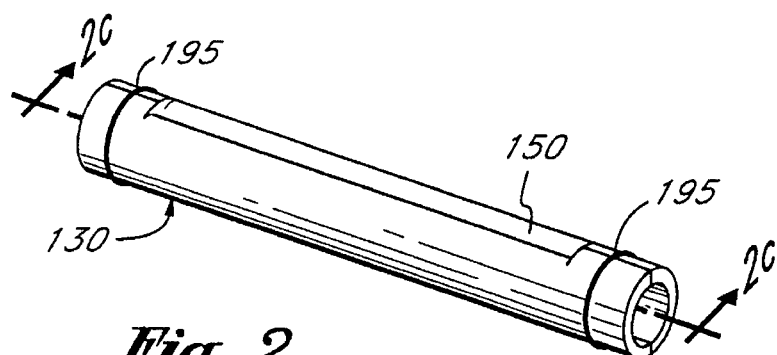
FIG. 2 is a perspective view of a pivot bushing forming part of the cable protector of FIGS. 1 and 2.
Figure 2A:
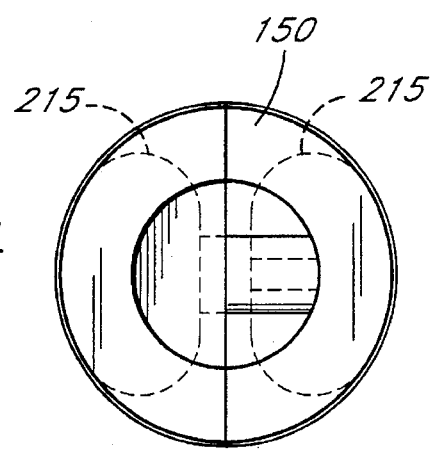
FIG. 2a is an end view of the pivot bushing shown in FIG. 2.
Figure 2B:
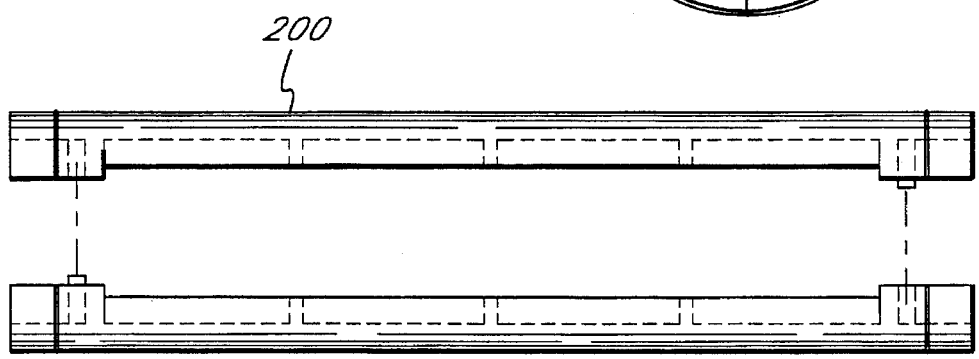
FIG. 2b is an exploded view showing two halves which join to form the pivot bushing of FIG. 2.

As shown more clearly in FIGS. 1a, 2 and 2a, the pivot bushing 130 includes a slot 150 which is wide enough to allow the cable 125 and a portion of the shields 140 to pass through. The shields include laterally extending projections 155, which are wider than the slot 150, so that they are not able to pass through the slot. The projections facilitate insertion of the cable 125 between the shields 140 and through the slot 150 because the shields 140 are not free to slide completely through the slot, although limited movement between the shields and the bushing occurs during hinging action of the cover.

The shields 140 are fastened to the cover 112 by means of screws 160 which pass through holes 158 in the projections and mount in lugs 165. The mounting lugs 165 are integrally formed with the cover, and may include a threaded brass insert (not shown) to receive and retain the screws 160. The cable 125 is also attached to the cover by means of the screws 160 and the mounting lugs 165. Although not shown here, the cable 125 includes a connection bar which extends across the cable and has holes to connect the cable to the mounting lugs 165 by means of the screws 160. The connection bar also acts as a stiffening member which increases the stiffness of the cable 125 near the pivot bushing 130.

Ears 175 are integrally formed with the cover to retain the bushing 130. A bezel 180, which constitutes a portion of the front face of the screen 115, also acts to retain the bushing 130. Generally, the ears 175, along with a ledge portion 185 of the backing 170, prevent the bushing 130 from moving vertically, while the bezel 180, together with the rear wall of the cover, prevent the bushing 130 from moving front to back. The bezel 180 is provided with a notch 187 which prevents the bezel from pressing against the pivot bushing 130 in those cases where the pivot bushing may extend beyond the ledge 185. The sheath 139 on the inside of the slot 150 also prevents the bushing 130 from moving significantly in the lateral directions. Thus, although the bushing 130 is somewhat free to rotate, or "float," about a longitudinal axis 190 (as dictated by the stiffness of the cable 125) the bushing is substantially immobile with respect to translational motion. Small ridges 195 formed around the ends of the pivot bushing 130 act as bearing surfaces which facilitate the rotational mobility of the pivot bushing.

It should be noted here that, in one advantageous application, the bezel 180 inserts and attaches to the cover by means of a special "push-and-slide" method. That is, the bezel 180 is pushed against the cover while the bottom edge of the bezel is still slightly offset from the bottom edge of the backing. An assembler then slides the bezel 180 in the upward direction to engage the bezel with the cover. Because of this method of assembly, the notch 187 is elongated to allow sufficient room for the pivot bushing 130 as the bezel 180 slides upwardly as viewed in FIG. 1a.

Figure 2C:
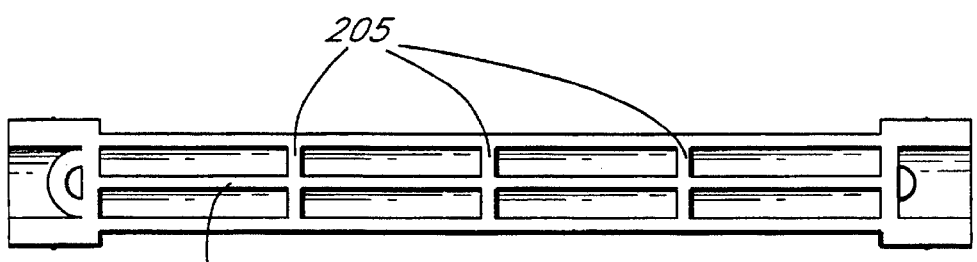
FIG. 2c is a cross-sectional view along the line 2c–2c of FIG. 2 which shows the ribbed supporting structure of the pivot bushing.

Referring now to FIGS. 2–2c, the pivot bushing 130 has an elongate cylindrical body with the slot 150 extending diametrically therethrough, and having an elongated flat shape. The bushing 130 is advantageously formed from two identical, mating halves 200, which may be snapped together by aligned pin and socket portions, and then plastic welded together. In one embodiment, each half of the pivot bushing 130 has radial or lateral ribs 205 and a longitudinal axially extending rib 210 which serve as supports to stiffen the bushing 130, although the halves 200 may also be solid. Entry and exit edges 215 of the slot 150 are rounded to increase the bending radius of the flex cable 125 (FIGS. 1 and 1a), as shown in greater detail in FIGS. 4a–4c below. In one embodiment, the halves 200 of the pivot bushing may be molded of suitable plastic, although other suitable materials may be used.

With reference to FIGS. 3a–3c and 4a–4c, the operation of the pivot bushing 130 within the computer 100 (shown in phantom) is clearly shown. For convenience of reference, the angle between the cover 112 and the base 110 of the computer will be defined in the following description as 0° in the fully closed position, 90° in the vertical position, and 180° in the fully open position.

Figure 4C:
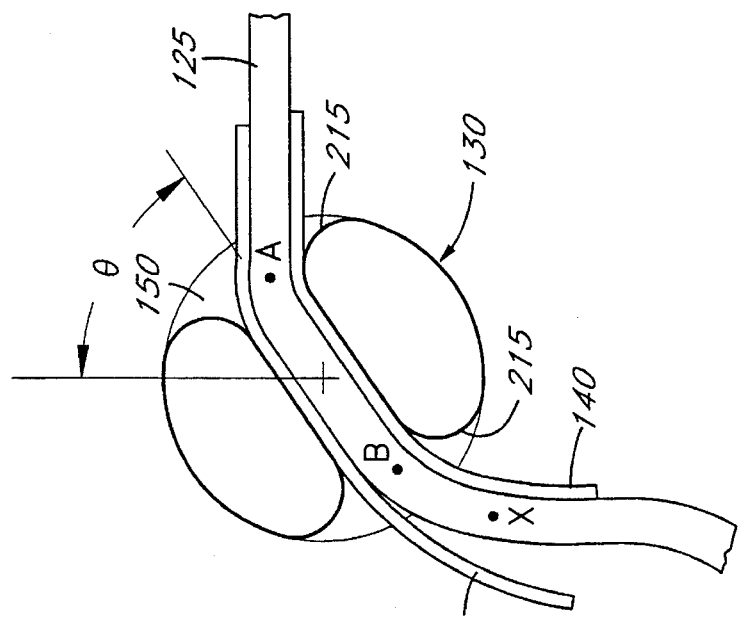
FIGS. 4a–4c are enlarged views of the pivot bushing area in corresponding FIGS. 3a–3c, respectively.
Figure 4B:
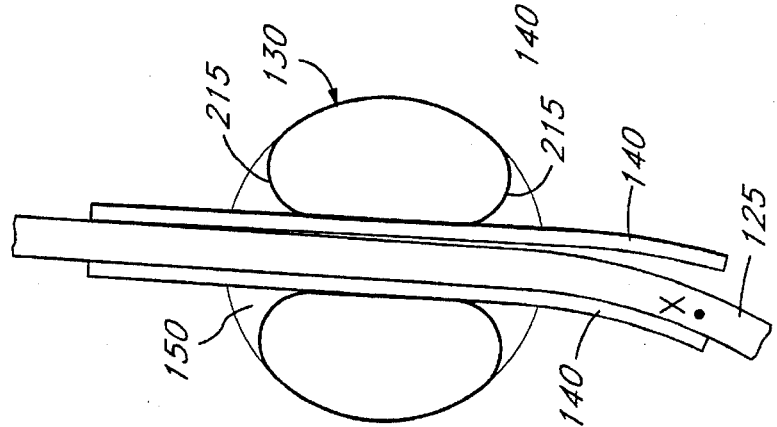
Figure 4A:
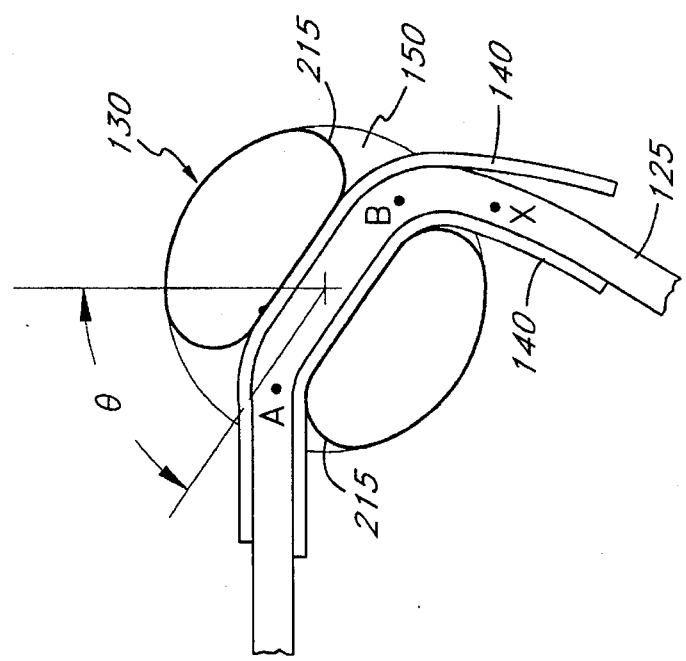

FIGS. 3a and 4a show the cover 112 in the fully closed position, wherein, an upper portion 300 of the flex cable 125 lies substantially parallel to the horizontal defined by the bottom surface of the base 110 and thus rests at an angle of approximately 0°. A lower portion 305 of the flex cable 125 extends substantially vertical with respect to the base 110 (i.e. perpendicular to the bottom surface of the base). It should be noted that the lower portion of the flex cable curves gradually as it extends into the base 100, however, for purposes of the analysis presented herein, this curvature is insignificant near the bushing pivot 130 and does not significantly contribute to stress fatigue on the cable 125. Thus, the total angle which the cable 125 at that lower portion bends is approximately 90°.

FIG. 4a shows the advantages of the pivot bushing 130 in greater detail. Because the bushing 130 is not fixed with respect to either the base 110 or the cover 112, but instead is allowed to freely rotate, or "float" with respect to both the cover and the base, the bushing rotates slightly to accommodate bending in the cable 125. As stated above, the cable 125 is attached to the cover so that the upper portion 300 of the flex cable is essentially immobile with respect to the cover 112. Closing the cover causes the cable 125 to pull slightly in the direction that the upper portion 300 of the cable extends (note the location of a point "X" on the cable 125 for the cases shown in FIGS. 4a–4c). The force applied by the cable 125 causes the bushing 130 to rotate until the counter force applied by the bottom portion 305 of the cable causes the system to reach equilibrium, as shown in FIG. 4a.

The angle of rotation of the bushing 130, designated by the angle $\theta$ in FIG. 4a, varies as a function of cable stiffness, and generally ranges from about 45° with respect to vertical for very stiff cables, to about 30° with respect to the vertical for more flexible cables. The rotation of the bushing 130 provides significant advantages. Most notably, the bending of the cable 125 is distributed over two locations on the cable, as designated by the bending points "A" and "B." Thus, in moving the cover 90° what would normally result in a 90° bend of the cable at a single point without the bushing 130, instead produces only a cable bending curvature equal to $\theta°$ at the point "B" and a bending curvature of $(90-\theta)°$ at the point "A" for the case shown in FIG. 4a. For example, in the optimum case where the bushing 130 rotates to an angle of 45° with respect to the vertical, the cable 125 bends 45° at the point "A" and 45° at the point "B." This distribution of bending over two points on the cable 125 by means of the floating bushing 130 has been found to increase the longevity of most flex cables 8–10 times that observed in applications wherein bending occurs at a single point. A further advantage of the pivot bushing 130 is the fact that the edges 215 at the entry and exit of the slots are rounded. The rounded edges 215 provide an increased bending radius near the points "A" and "B," which further reduces fatigue due to bending stress.

As previously noted the bushing is mounted on the hinge axis of the screen and base. This assures proper operation of the pivot bushing 130 since the hinge area is the only region where significant bending of the cable 125 occurs.

In addition to the aforementioned advantages produced by providing a floating pivot bushing 130 having rounded edges 215, the present invention also reduces frictional wear. This is accomplished by means of the shields 140 which have a low friction surface so that the shields move within the bushing slot without significant wear. Although the base ends of the shields are free to move, there is very little relative movement between the shields and the cable, since the cable and the shields are fixed to the cover at the lugs 165. Further, any relative movement between the cable and the bushing is felt by the shields instead of the bushing. In addition, the pivot bushing 130 prevents "moaning," that is, the sound the cable 125 often makes when pulled over a high friction surface.

FIGS. 3b and 4b, show the cover 112 in the vertical position. In this case, there is no significant bend in the cable 125, and the pivot bushing slot 150 is substantially vertical.

FIGS. 3c and 4c show the cover 112 in the fully open position. This position is comparable to the position shown in FIGS. 3a and 4a, with the exception that the bending of the cable 125 occurs in the opposite direction. Thus, it is clear that the total expected bending curvatures at the points "A" and "B" respectively, are double that shown in either FIGS. 3a and 4a, or 3c and 4c, with 180° movement of the cover. Therefore, the expected total bending curvature at the point "B" may be calculated as $2\theta°$ and the total expected bending curvature at the point "A" may be calculated as $2(90-\theta)°$, where the angle $\theta$ is a function of cable stiffness as mentioned above.

This illustrates why an angle of 45° is theoretically the preferred angle in that the cable receives the same bending at both A and B. If the bushing rotation angle is only 30° the total bending at B is 60° for 180° cover rotation, and the total bending at A is 120°. This unequal distribution of bending, and hence cable fatigue, would theoretically cause a cable to fail at Point A before Point B.

The present invention may be embodied in other specific forms without departing from its spirit or essential characteristics. The bushing may also be used in other applications which are similar to that described above. These and other obvious modifications to the invention may be contemplated by those skilled in the art. Therefore, the above specification is to be considered as merely illustrative and not restrictive. The scope of the invention should instead be understood as defined by the appended claims.

What is claimed is:

1. An electronic apparatus comprising:
   a first portion including at least one electronic component;
   a second portion including at least one electronic component;
   hinge means pivotally connecting said first and second portions;
   a movable member movably positioned on at least one of said first and second portions and adapted for independent movement with respect to said first and second portions and said hinge means during pivotal movement of at least one of said portions, said movable member being a separate member from said hinge means; and
   a flexible cable for electrically interconnecting said electronic component of said first portion with said electronic component of said second portion, said flexible cable passing through said movable member and engaging said movable member during said pivotal movement to effect movement of said movable member.

2. An electronic apparatus as recited in claim 1 wherein said first and second portions can be pivoted back and forth between:
   (a) a fully closed position in which the angle between said first portion and said second portion is 0° and
   (b) a fully opened position in which the angle between said first portion and said second portion is 180°.

3. An electronic apparatus as recited in claim 1 wherein:
   (a) said hinge means includes a first hinge portion and a second hinge portion, said first hinge portion being axially spaced from said second hinge portion;
   (b) said movable member is positioned between said first and second hinge portions and includes a first end portion extending into said first hinge portion and a second end portion extending into said second hinge portion for rotatably mounting said movable member in said hinge means; and
   (c) said movable member and said hinge means cooperate to permit pivotal movement of said first and second portions between:
      (i) a fully closed position in which the angle between said first portion and said second portion is 0° and
      (ii) a fully opened position in which the angle between said first portion and said second portion is 180°.

4. An electronic apparatus as recited in claim 1 wherein:
   (a) said first portion includes a back wall, a ledge portion extending from said back wall adjacent to a bottom portion of said movable member, and a pair of ears integrally formed on said back wall and extending therefrom adjacent to a top portion of said movable member and
   (b) said back wall, said ledge portion, and said pair of ears retain said movable member to prevent movement of said movable member in either a vertical or a horizontal direction and to permit pivotal movement of said first and second portions between:
      (i) a fully closed position in which the angle between said first portion and said second portion is 0° and
      (ii) a fully opened position in which the angle between said first portion and said second portion is 180°.

5. An electronic apparatus as recited in claim 1 and further including a pair of shields passing through said movable member on opposite sides of said cable:
   (a) to form a protective sheath for said cable,
   (b) to prevent movement of said movable member in either a vertical or a horizontal direction, and
   (c) to permit pivotal movement of said first and second portions between:
      (i) a fully closed position in which the angle between said first portion and said second portion is 0° and
      (ii) a fully opened position in which the angle between said first portion and said second portion is 180°.

6. An electronic apparatus as recited in claim 1 wherein:
   (a) said hinge means includes a first hinge portion and a second hinge portion, said first hinge portion being axially spaced from said second hinge portion;
   (b) said movable member is positioned between said first and said second hinge portions and includes a first end portion extending into said first hinge portion and a second end portion extending into said second hinge portion for rotatably mounting said movable member in said hinge means;
   (c) said first portion includes a back wall, a ledge portion extending from said back wall adjacent to a bottom portion of said movable member, and a pair of ears integrally formed on said back wall and extending therefrom adjacent to a top portion of said movable member.

7. An electronic apparatus as recited in claim 1 wherein:
   (a) said flexible cable undergoes bending during said pivotal movement and
   (b) said flexible cable includes:
      (i) a first bending point at a first location on said flexible cable and
      (ii) a second bending point at a second location on said flexible cable spaced from said first location, (c) whereby the total bending of said flexible cable is distributed between said first location and said second (d) said back wall, said ledge portion, and said pair of ears retain said movable member;

(e) said electronic apparatus further includes a pair of shields passing through said movable member on opposite sides of said cable to form a protective sheath for said cable; and (f) said movable member, said hinge means, said back wall, said ledge portion, said pair of ears, and said pair of shields cooperate to prevent movement of said movable member in either a vertical or a horizontal direction and to permit pivotal movement of said first and second portions between:
  (i) a fully closed position in which the angle between said first portion and said second portion is 0° and
  (ii) a fully opened position in which the angle between said first portion and said second portion is 180°.

8. An electronic apparatus as recited in claim 1 wherein, at each instant during said pivotal movement:
  (a) said flexible cable exerts a first force at a first location on said movable member;
  (b) said flexible cable exerts a second force at a second location on said movable member spaced from said first location;
  (c) said first force and said second force cause rotation of said movable member; and
  (d) said movable member equalizes said first force and said second force, thereby increasing the longevity of said flexible cable. location at each instant during said pivotal movement, thereby increasing the longevity of said flexible cable.

9. An electronic apparatus comprising:
a first portion including a first electronic component;
a second portion including a second electronic component;
a hinge pivotally connecting the first and second portions;
a member movably positioned on at least one of said portions and adapted for independent movement with respect to said portions and said hinge during pivotal movement of one of said portions, said member being separate from said hinge; and
a flexible cable electrically connecting said components, said cable passing through and engaging said member during said pivotal movement to cause movement of said member.

10. An electronic apparatus as recited in claim 9 wherein said first and second portions can be pivoted back and forth between:
  (a) a fully closed position in which the angle between said first portion and said second portion is 0° and
  (b) a fully opened position in which the angle between said first portion and said second portion is 180°.

11. An electronic apparatus as recited in claim 9 wherein:
  (a) said hinge includes a first hinge portion and a second hinge portion, said first hinge portion being axially spaced from said second hinge portion;
  (b) said member is positioned between said first and second hinge portions and includes a first end portion extending into said first hinge portion and a second end portion extending into said second hinge portion for rotatably mounting said member in said hinge; and
  (c) said member and said hinge cooperate to permit pivotal movement of said first and second portions between:
    (i) a fully closed position in which the angle between said first portion and said second portion is 0° and
    (ii) a fully opened position in which the angle between said first portion and said second portion is 180°.

12. An electronic apparatus as recited in claim 9 wherein:
  (a) said first portion includes a back wall, a ledge portion extending from said back wall adjacent to a bottom portion of said member, and a pair of ears integrally formed on said back wall and extending therefrom adjacent to a top portion of said member and
  (b) said back wall, said ledge portion, and said pair of ears retain said member to prevent movement of said member in either a vertical or a horizontal direction and to permit pivotal movement of said first and second portions between:
    (i) a fully closed position in which the angle between said first portion and said second portion is 0° and
    (ii) a fully opened position in which the angle between said first portion and said second portion is 180°.

13. An electronic apparatus as recited in claim 9 and further including a pair of shields passing through said member on opposite sides of said cable:
  (a) to form a protective sheath for said cable,
  (b) to prevent movement of said member in either a vertical or a horizontal direction, and
  (c) to permit pivotal movement of said first and second portions between:
    (i) a fully closed position in which the angle between said first portion and said second portion is 0° and
    (ii) a fully opened position in which the angle between said first portion and said second portion is 180°.

14. An electronic apparatus as recited in claim 9 wherein:
  (a) said hinge includes a first hinge portion and a second hinge portion, said first hinge portion being axially spaced from said second hinge portion;
  (b) said member is positioned between said first and said second hinge portions and includes a first end portion extending into said first hinge portion and a second end portion extending into said second hinge portion for rotatably mounting said member in said hinge;
  (c) said first portion includes a back wall, a ledge portion extending from said back wall adjacent to a bottom portion of said member, and a pair of ears integrally formed on said back wall and extending therefrom adjacent to a top portion of said member;
  (d) said back wall, said ledge portion, and said pair of ears retain said member;
  (e) said electronic apparatus further includes a pair of shields passing through said member on opposite sides of said cable to form a protective sheath for said cable; and
  (f) said member, said hinge, said back wall, said ledge portion, said pair of ears, and said pair of shields cooperate to prevent movement of said member in either a vertical or a horizontal direction and to permit pivotal movement of said first and second portions between:
    (i) a fully closed position in which the angle between said first portion and said second portion is 0° and
    (ii) a fully opened position in which the angle between said first portion and said second portion is 180°.

15. An electronic apparatus as recited in claim 9 wherein:
  (a) said flexible cable undergoes bending during said pivotal movement and
  (b) said flexible cable includes:

(i) a first bending point at a first location on said flexible cable and (ii) a second bending point at a second location on said flexible cable spaced from said first location, (c) whereby the total bending of said flexible cable is distributed between said first location and said second location at each instant during said pivotal movement, thereby increasing the longevity of said flexible cable.

16. An electronic apparatus as recited in claim 9 wherein, at each instant during said pivotal movement:

(a) said flexible cable exerts a first force at a first location on said member;

(b) said flexible cable exerts a second force at a second location on said member spaced from said first location;

(c) said first force and said second force cause rotation of said member; and (d) said member rotates equalizing said first force and said second force, thereby increasing the longevity of said flexible cable.

* * * * *

UNITED STATES PATENT AND TRADEMARK OFFICE
CERTIFICATE OF CORRECTION

PATENT NO. : 5,581,440
DATED : December 3, 1996
INVENTOR(S) : Peter K. Toedter

It is certified that error appears in the above-identified patent and that said Letters Patent is hereby corrected as shown below:

Column 6,
Line 57, change "member." to -- member; -- and insert the following paragraphs after line 57:
-- (d) said back wall, said ledge portion, and said pair of ears retain said movable member;
   (e) said electronic apparatus further includes a pair of shields passing through said movable member on opposite sides of said cable to form a protective sheath for said cable; and
   (f) said movable member, said hinge means, said back wall, said ledge portion, said pair of ears, and said pair of shields cooperate to prevent movement of said movable member in either a vertical or a horizontal direction and to permit pivotal movement of said first and second portions between:
   (i) a fully closed position in which the angle between said first portion and said second portion is 0° and
   (ii) a fully opened position in which the angle between said first portion and said second portion is 180°. --

Column 7,
Delete the text in lines 3-18, and insert the following text following line 2 as part of the paragraph (c) that starts in line 1:
-- location at each instant during said pivotable movement, thereby increasing the longevity of said flexible cable. --

Signed and Sealed this

Twenty-third Day of April, 2002

*Attest:*

JAMES E. ROGAN
*Attesting Officer*     *Director of the United States Patent and Trademark Office*